US012282267B2

(12) United States Patent
Cousoulis et al.

(10) Patent No.: US 12,282,267 B2
(45) Date of Patent: Apr. 22, 2025

(54) ELECTROPHOTOGRAPHIC CONTROL IN IMAGING DEVICES, INCLUDING SENSING CURRENT BETWEEN A DEVELOPER ROLL AND DRUM PERTAINING TO CURRENT OF A LATENT IMAGE AND A PASCHEN BREAKDOWN

(71) Applicant: LEXMARK INTERNATIONAL, INC., Lexington, KY (US)

(72) Inventors: Marc Cousoulis, Lexington, KY (US); Michael Charles Day, Lexington, KY (US); Kweku Korsah, Lexington, KY (US); Jared Kouhui Lin, Lexington, KY (US); David William Shuman, Lexington, KY (US); Matthew Russell Smither, Frankfort, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 18/092,368

(22) Filed: Jan. 2, 2023

(65) Prior Publication Data

US 2024/0201614 A1 Jun. 20, 2024

Related U.S. Application Data

(63) Continuation of application No. 18/080,848, filed on Dec. 14, 2022, now abandoned.

(51) Int. Cl.

| | |
|---|---|
| ***G03G 15/08*** | (2006.01) |
| ***G03G 15/00*** | (2006.01) |
| ***G03G 15/02*** | (2006.01) |
| ***G03G 15/043*** | (2006.01) |

(52) U.S. Cl.

CPC ..... *G03G 15/0808* (2013.01); *G03G 15/0266* (2013.01); *G03G 15/043* (2013.01); *G03G 15/5004* (2013.01); *G03G 2215/00632* (2013.01); *G03G 2215/066* (2013.01)

(58) Field of Classification Search

USPC .......... 399/38

See application file for complete search history.

(56) References Cited

U.S. PATENT DOCUMENTS

2008/0080884 A1* 4/2008 Yamane .............. G03G 15/065 399/56
2009/0070082 A1 3/2009 Sasaki
2015/0261162 A1* 9/2015 Kaneko .............. G03G 15/043 399/72

(Continued)

FOREIGN PATENT DOCUMENTS

JP 2013054107 3/2013
JP 2022082352 A * 6/2022

*Primary Examiner* — Quana Grainger

(57) ABSTRACT

An imaging device has a developer roll to provide toner to a photoconductive drum to develop a latent image on the drum for direct transfer to media or an intermediate transfer member. A power supply in communication with a controller sets relative voltages on the developer roll and drum. During transfer of the toner, the imaging device determines a current between the developer roll and drum. In turn, the controller determines a charge and mass of the toner for setting with the power supply an operating voltage on the drum or developer roll. Preventing and reporting toners with insufficient charge are other embodiments.

17 Claims, 4 Drawing Sheets

(56) References Cited

U.S. PATENT DOCUMENTS

| | | | | |
|---|---|---|---|---|
| 2018/0364618 | A1 | 12/2018 | Maeyama | |
| 2019/0129328 | A1* | 5/2019 | Watanabe .......... | G03G 15/0848 |
| 2021/0263441 | A1 | 8/2021 | Shimizu | |

* cited by examiner

ELECTROPHOTOGRAPHIC CONTROL IN IMAGING DEVICES, INCLUDING SENSING CURRENT BETWEEN A DEVELOPER ROLL AND DRUM PERTAINING TO CURRENT OF A LATENT IMAGE AND A PASCHEN BREAKDOWN

FIELD OF THE INVENTION

The present disclosure relates to the electrophotographic (EP) process in imaging devices, such as printers, copiers, all-in-ones, multi-function devices, etc. It relates further to setting operating conditions based on specific charges of toner determined during use. Among the embodiments, methods and apparatus include circuitry and processing techniques for determining current between a developer roll and photoconductive drum and for determining charge based thereon. Preventing from usage toners having insufficient charge are still other embodiments.

BACKGROUND

The EP process includes a laser discharging a charged photoconductive (PC) drum to create a latent image that becomes developed with one or more toners (e.g., black, cyan, magenta, yellow). A voltage difference between the drum and an opposed transfer roll transfers the image to a media sheet or to an intermediate transfer member (ITM) for subsequent transfer to a media sheet. A corona or charge roll sets the charge on the PC drum and a developer roll introduces the toner to the latent image. A controller coordinates with one or more high voltage power supplies to provide power to the laser and to set relevant charges on the rolls. The controller optimizes the charge based on the particular toners used in the imaging device. As is known, toner particles have specific charges (μC/g) that dictate development properties.

To arrive at given development properties, imaging print density is determined by producing solid toner patches on an intermediate transfer member (e.g., belt). Light illuminates the patches, which scatters the light, to which specular and diffuse sensors gather the scattered light. From there, the controller calculates the operating conditions, as is known.

With black toner patches, however, it is common to overlay the black toner on a different colored toner, such as magenta, because black toner has low reflectance and is mostly diffusely scattered. The controller determines how much of the magenta toner patch is hidden by the black toner patch upon illumination from a light source. Problematically, monochromatic-only (e.g., black-only) imaging devices have no ability to overlay a black toner patch over a magenta toner patch, so toner patch sensing systems that determine print density offers problems not found in a multi-colored toner imaging devices. Also, merely having a black toner patch on an ITM results in too little reception of scattered light with a diffusion sensor and early signal saturation occurs with a spectral reflectance sensor such that the controller has difficulty determining the correct mass of black toner. The inventors have identified a need to overcome these and other problems.

SUMMARY

The embodiments described herein relate to methods and apparatus that set optimal operating conditions for the EP imaging process. In one embodiment, an imaging device has a developer roll to provide toner to a photoconductive drum to develop a latent image on the drum for direct transfer to media or an intermediate transfer member. A power supply in communication with a controller sets relative voltages on the developer roll and drum. As it happens, when toner develops from the developer roll to the photoconductive drum, the movement of the charged toner particles creates a measurable current that circuitry captures. Then, once the charge is known, the mass of toner can be calculated by the controller and the power supply can set an appropriate operating voltage on the drum and developer roll based on any given toner.

In other embodiments, the controller prevents toners having inadequate charge from operating in the imaging device, and reports the same to prevent similar use. As is known, mechanically milled toner has a substantially lower charge than, preferred, chemically prepared toner and an added safety benefit for operating the imaging device within preferred boundaries includes only allowing toners to operate that have a sufficient minimum charge. In this way, longevity and other benefits are noted for imaging devices by preventing or limiting contamination of the fuser and filming of the ITM, drum, developer roll, and or the doctor blade. Techniques herein may alternatively apply to multi-colored imaging devices as well as monochromatic-only imaging devices. Similarly, techniques may apply with direct-transfer imaging devices, in addition to imaging devices having ITM's.

IN THE DRAWINGS

DETAILED DESCRIPTION OF THE EMBODIMENTS

Figure 1:
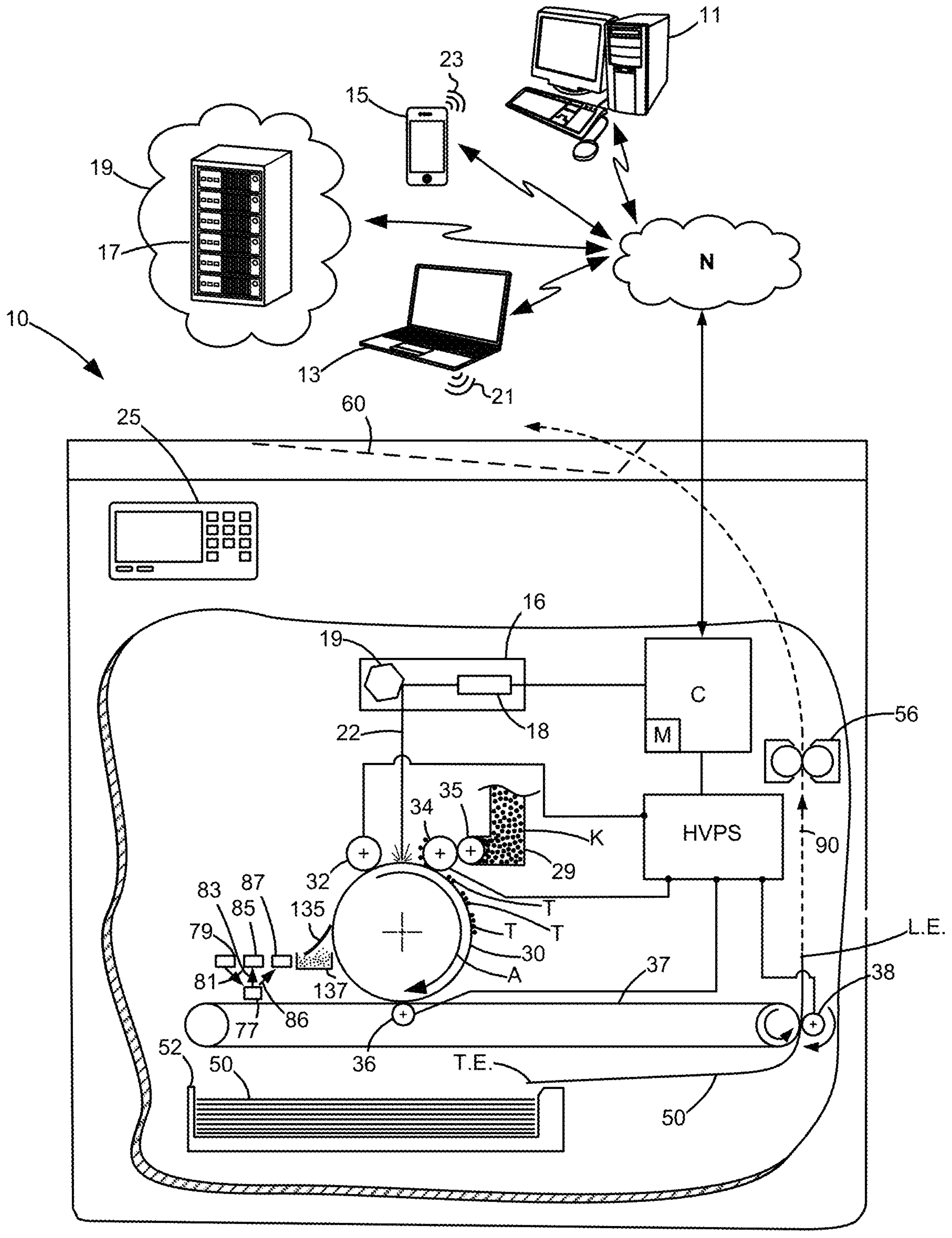
FIG. 1 is a diagrammatic view of an imaging device having representative electrophotographic control according to embodiments of the invention.

FIG. 1 teaches an imaging device 10 having electrophotographic control according to the embodiments herein. The device is monochromatic-only, e.g., black only, or color-imaging capable (not shown). The device receives at a controller, C, an imaging request for imaging media 50. The controller typifies an ASIC(s), circuit(s), microprocessor(s), firmware, software, or the like. The request comes from external to the imaging device, such as from a computer 11, laptop 13, smart phone 15, print server or other server 17, cloud service 19, fax machine (not shown), etc. The request can come direct to the imaging device, such as from a Bluetooth 21 or Wi-Fi connection 23, or from a computing network environment, N. It can also come internally, such as from a copying request, an email request, or the like entered by a user at a UI panel 25, for instance.

In any context, the controller converts the request to appropriate signals for providing to a laser scan unit 16. The unit turns on and off a laser 18 according to pixels of the imaging request. A rotating mirror 19 and associated lenses, reflectors, etc. (not shown) focus a laser beam 22 onto a photoconductive drum 30 rotating in the direction of arrow (A), as is familiar. The drum corresponds to a supply of toner, such as black (k), changeable by users in the form of a replaceable toner cartridge 29. A charge roll 32 sets a charge on a surface of the drum 30 as the drum rotates. The laser beam 22 electrostatically discharges the drum to create a latent image. A developer roll 34 introduces toner T to the latent image and such is electrostatically attracted to create a toned image on a surface of the drum. A toner adder roll 35 also works in conjunction with the developer roll to introduce toner from the toner supply to the developer roll. A voltage differential between the surface of the drum 30 and an opposed transfer roll 36 transfers the toned image at first transfer from the drum to an intermediate transfer member (ITM) 37, e.g., belt, and for subsequent, or second transfer, to a sheet of media 50 by way of another voltage differential at a second transfer roll 38. (Alternatively, the toned image may be transferred direct to a sheet of media in an imaging device without an intermediate transfer member.) Afterwards, the sheet advances from a tray 52 to a fuser assembly 56 to fix the toned image to the media through application of heat and pressure. Users pick up the media from a bin 60 after it advances out of the imaging device. The controller coordinates the operational conditions that facilitate the timing of the image transfer and transportation of the media from tray to output bin. The controller also coordinates with one or more high voltage power supplies 90 to set the relative voltages for the electrophotographic image process, including setting the voltages for the charge roll 32, the developer roll 34, and the transfer rolls 36, 38. A blade 135 scrapes into a reservoir 137 excess toner from the drum and the process repeats for the next image on the drum.

To periodically identify imaging print density, the controller C develops on the ITM 37 one or more toner patches 77. A light source 79, such as an LED transmitter, illuminates the toner patch with light 81 that the toner patch scatters 83 upon reflection. A diffuse light sensor 85 (angled to collect light scattered approximately 90° from the toner patch) and specular light sensor 87 (angled to collect light scattered about the same angle as the incident light from the light source, or angled to collect light scattered approximately 45° from the toner patch) collect the scattered light and signal to the controller C their various readings. As described in more detail below, with reference to FIG. 3, the controller uses this information in combination with a current between the developer roll and the drum to determine toner density and set appropriate voltages on the various rolls and drum to optimally control the EP process.

Figure 2:
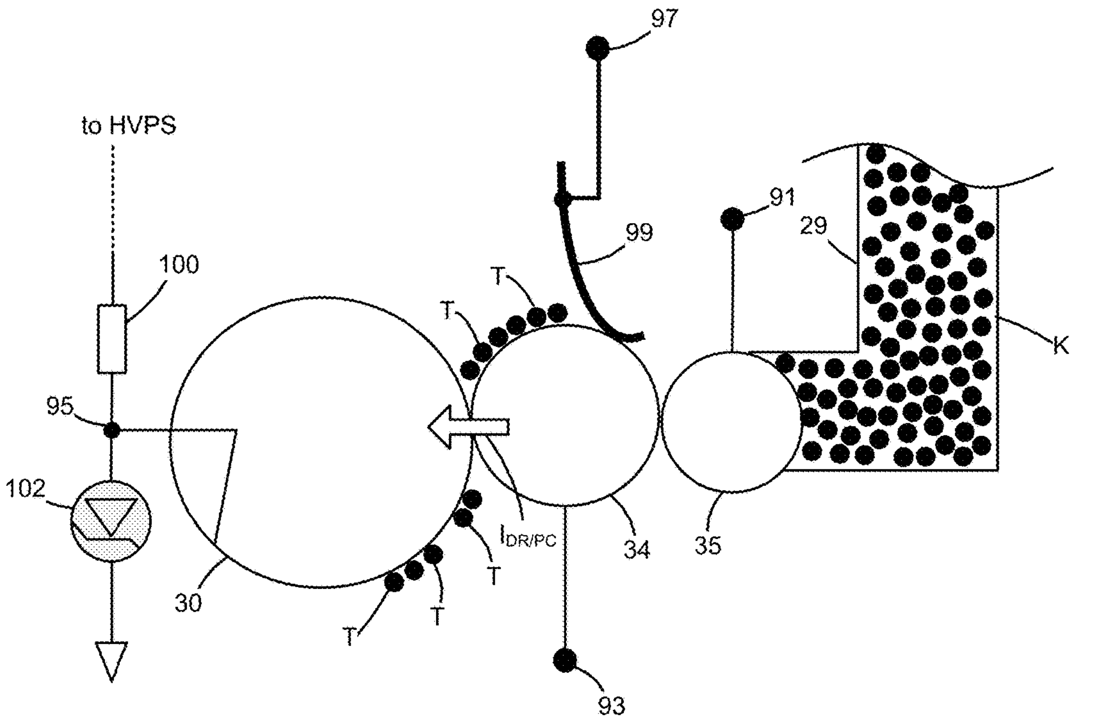
FIG. 2 is a diagrammatic view of an environment showing current between the developer roll and photoconductive drum.

With reference to FIG. 2, a more detailed view is provided of the arrangement of the toner adder roll 35, the developer roll 34, and the drum 30. This includes nodes 91, 93, and 95 to set the relative voltages on the rolls 35, 34, and drum 30. The nodes connect to the high voltage power supply and voltages often range from a tens of volts to thousands. Typical voltages for the developer roll range from −300 Vdc to −950 Vdc, with −750 Vdc being typical. The voltage of the surface of the drum as provided by the charging mechanism is typically −50 Vdc to −250 Vdc more negative than the developer roll, with an offset of −150 Vdc being typical. Node 97 also exists and serves to bias a doctor blade 99 for metering out the toner T to the developer roll 34 from the toner adder roll 35. Voltage on the doctor blade is typically 0 Vdc to −200 Vdc more negative than the developer roll with an offset of −150 Vdc being typical. Node 91 also exists and serves to bias a toner adder roll 35 for delivering out the toner T to the developer roll 34. Voltage on the toner adder roll is typically 0 Vdc to −200 Vdc more negative than the developer roll, with an offset of −150 Vdc being typical.

The voltage bias on the drum 30 also typically gets set by way of a resistor 100 and Zener diode 102 with node 95 being tapped between the two. With the foregoing arrangement, when toner T develops during use from the developer roll to the photoconductive drum, the movement of the charged toner particles creates a current measurable by circuitry given as $I_{DR/PC}$. In turn, the controller uses this current to determine the mass of the toner and set operating conditions for the EP process. Also, skilled artisans will note that the current $I_{DR/PC}$ is a conglomeration of other currents. Namely, $I_{DR/PC}$ includes therein the actual current of the toner ($I_{Toner}$), the current of the latent image developed on the drum ($I_{Latent\ Image}$), and the current associated with the Paschen breakdown voltage between the developer roll and the drum ($I_{DR/PC\ Paschen}$). Mathematically, the measurable current $I_{DR/PC}$ between the developer roll and the drum is represented as:

$$I_{DR/PC} = I_{Toner} + I_{Latent\ Image} + I_{DR/PC\ Paschen}. \quad \text{(Equation 1)}$$

As the current of interest for determining the mass of the toner is $I_{Toner}$, rearrangement of Equation 1 gives $I_{Toner}$ Equation 2 as follows:

$$I_{Toner} = I_{DR/PC} - I_{Latent\ Image} - I_{DR/PC\ Paschen}. \quad \text{(Equation 2)}$$

From empirical testing the conditions of the EP process after manufacturing the imaging device, for instance, the current of the latent image and that of the Paschen breakdown voltage are known. They are stored in a local or remote memory M (FIG. 1) that is accessible by the controller. The controller then subtracts these two currents $I_{Latent\ Image}$, $I_{DR/PC\ Paschen}$ from the measured current, $I_{DR/PC}$, and arrives at the current of the toner, $I_{Toner}$. Thereafter, the controller determines the charge Q of the toner as the current of the toner over time, ΔT, or:

$$Q_{Toner} = I_{Toner} \times \Delta T. \quad \text{(Equation 3)}$$

The mass of the toner, $M_{Toner}$, is then the charge of the toner at a given charge per mass, or:

$$M_{Toner} = Q_{Toner} @ Q/M. \quad \text{(Equation 4)}$$

Figure 3:
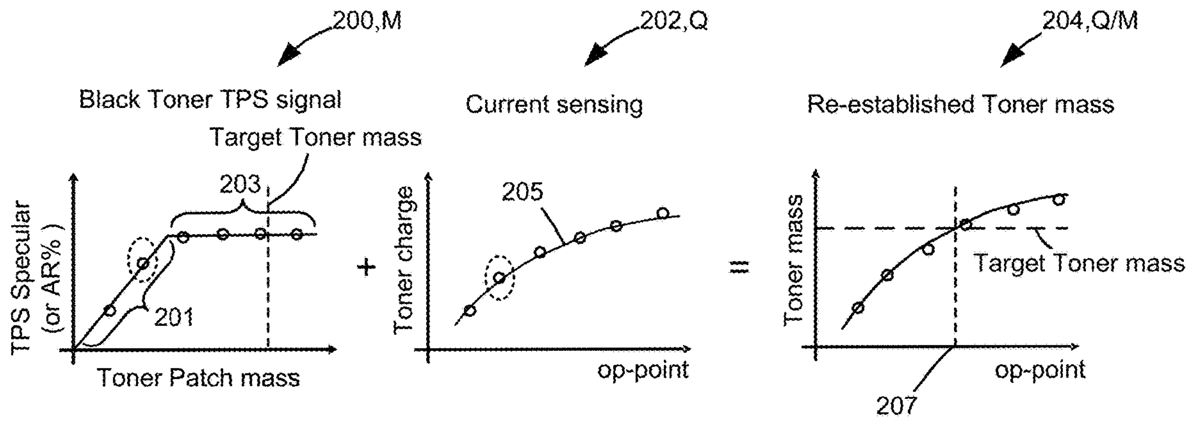
FIG. 3 is a plurality of graphs showing calculation of toner mass from light signals from scattered light of a toner patch sensing configuration and from the sensed current between the developer roll and photoconductive drum.

The way this works graphically is found with reference to FIG. 3. In graph 200, and with further reference to FIG. 1, a toner patch 77 is developed on the ITM 37 and light 83 is scattered upon reflection after illumination 81 from a light source 79. Scattered light 83 captured by the specular light sensor 87 (TPS (toner patch sensor) Specular) provides data points 201 in the portion of the graph 200 from which the mass, M, (x-axis) of the toner patch can be calculated before saturation occurs at the sensor at portions 203 of the graph. The charge, Q, of the toner is then calculated referencing graph 202. The curve 205 represents the plots from Equation 3, obtained from $I_{Toner}$, in turn, obtained from the measurable current $I_{DR/PC}$. Combining together the data from the graph of mass, 200, and the charge, 202, charge per mass, Q/M, is known for a particular toner at graph 204. At 207, a desired operational point for the toner can be calculated by comparing the toner mass to a given target. During use, this operational point gets calculated by the controller every two to five thousand pages printed by the imaging device and stored in memory. Of course, calculations can occur at other times, such as at times during inter-page gaps between trailing edges (TE) and leading edges (LE) of sheets of media 50. Still other embodiments are possible.

Figure 4:
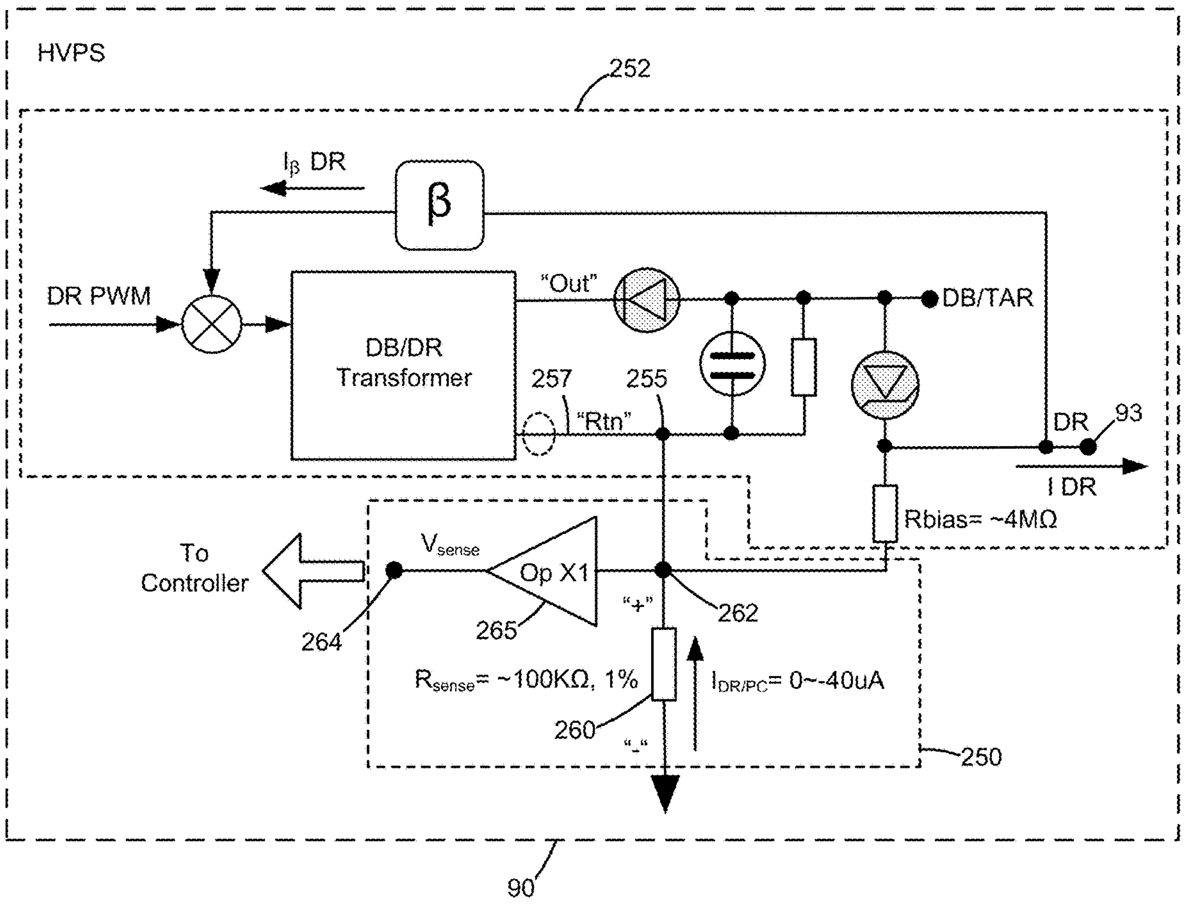
FIG. 4 is a circuit diagram for sensing the current between the developer roll and photoconductive drum, representatively located in a high-voltage power supply.

With reference to FIG. 4, a representative circuit 250 is provided for determining the current $I_{DR/PC}$ between the developer roll and photoconductive drum. The circuit is provided in this instance within the high-voltage power supply 90, but need not be located there or even in a power supply. A circuit to sense current can be mounted anywhere within the imaging device and still provide the functionality described herein. It has been found useful, however, to mount the circuit in the HVPS simply because it requires minimal additional components to do so. In any event, the circuit 250 herein is provided in conjunction with a traditional feedback circuit 252 of the power supply. It is tapped 255 in the return line 257 to the transformer 259 of the doctor blade 99 and developer roll 34 (FIG. 1). The circuit 255 includes a sensing resistor $R_{sense}$ 260 on the order of 100 KΩ through which the current $I_{DR/PC}$ is sensed. The current $I_{DR/PC}$ ranges on the order from 0 to about −40 μA and is provided direct to the controller C for calculating the charge and mass of the toner being sensed. Alternatively, a voltage ($I_{DR/PC} \times R_{sense}$) corresponding to the sensed current and sensing resistor at node 262 can be provided to the controller for calculations. Alternatively still, an amplified voltage $V_{sense \cdot amp}$ at node 264 output from an amplifier 265 can be supplied to the controller for calculations. The time for measuring $I_{DR/PC}$ occurs through the resistor $R_{sense}$ connected to ground for at least the time it takes to complete at least one full revolution of the transfer roll. In turn, the current may be averaged over this time, or its mean determined, or evaluated through other signal processing techniques.

Figure 5:
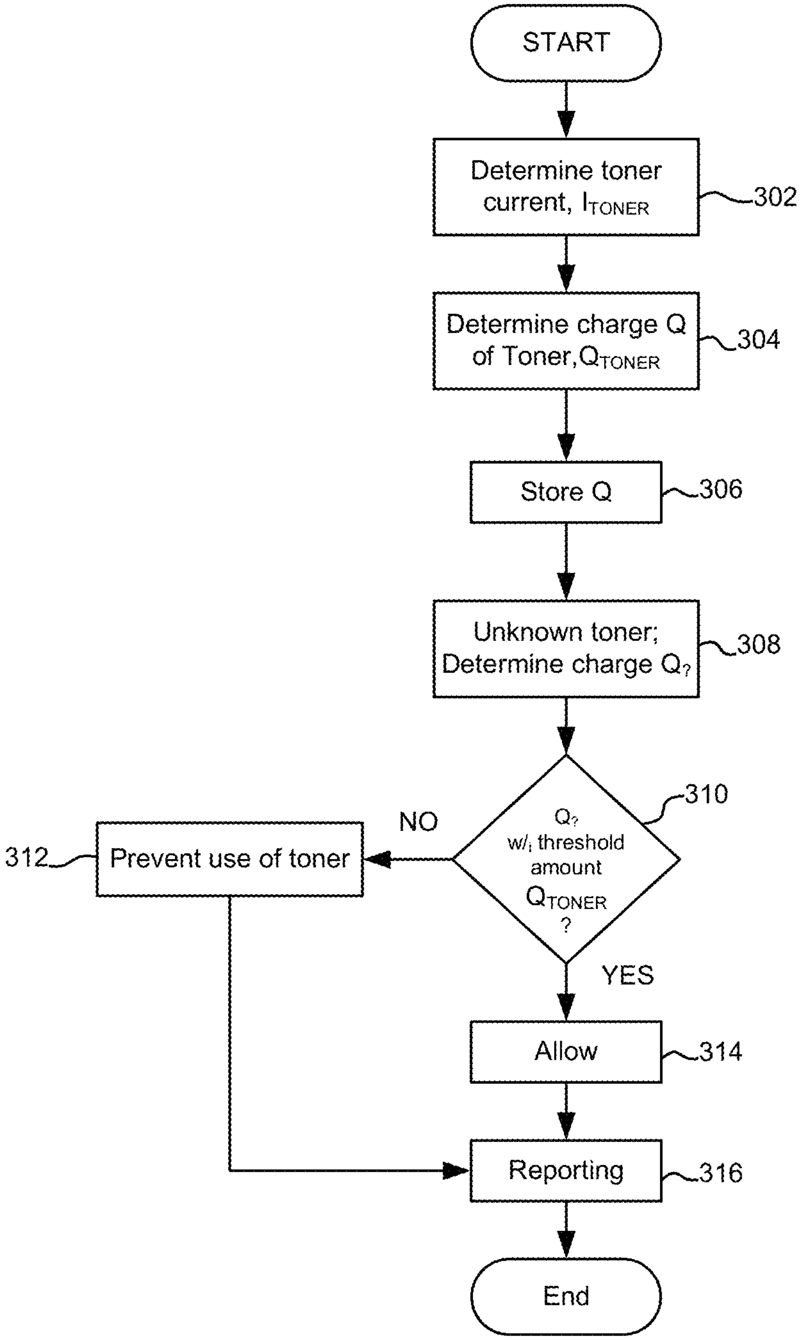
FIG. 5 is a flow chart for determining whether or not charge of a toner meets acceptable thresholds for use in an imaging device.

In other embodiments, FIG. 5 teaches using the knowledge of the charges of toners for determining whether or not a toner under consideration meets acceptable thresholds for use in an imaging device. As is known, chemically prepared toner (CPT) has better properties for controlling the EP process than cheaper, milled toner. As such, and owing to the fact that CPT has charges more than ten percent to a half better compared to milled toner, toner under consideration not meeting acceptable thresholds can be prevented from use in imaging devices and stopped from preventing damage in the devices or voiding warranties. Thus, at 302, the current $I_{DR/PC}$ between the developer roll and photoconductive drum is measured or sensed as described above. The current of the toner $I_{Toner}$ is then calculated from Equation 2. The charge $Q_{Toner}$ of the toner is calculated at 304 according to Equation 3. The charge is next stored in a memory available to the controller at 306. At 308, a charge $Q_?$ of a toner-under-consideration is then determined from the sensed current of that toner. At 310, the controller undertakes a comparison between the known charge $Q_{Toner}$ and the charge $Q_?$ of the unknown toner. If the unknown charge is within or not a threshold amount of the charge of known toner at 310, the toner under consideration can be prevented from use in the imaging device at 312 or allowed at 314. The controller can then report its findings at 316 to entities as appropriate. The reporting can occur direct to a computing device or over a network N (FIG. 1). Also, the threshold amount at 310 can be figured in a range, such as determining whether a charge is within or not about 10% to 30% or more of a known toner. Of course, other ranges are acceptable.

The foregoing description of the methods and apparatus has been presented for purposes of illustration. It is not intended to be exhaustive or to limit the claims. Modifications and variations to the description are possible in accordance with the foregoing. It is intended that the scope of the invention be defined by the claims.

The invention claimed is:

1. In an imaging device having a photoconductive drum opposed by developer roll to provide toner to the drum to develop a latent image on the drum for transfer to media or an intermediate transfer member and later the media, further including a power supply in communication with a controller, a method comprising:

with the power supply, setting a first voltage on a charge roll that creates a second voltage on a surface of the drum;

based on the first and second voltages, transferring the toner from a developer roll to the drum; and sensing a current between the developer roll and the drum, including determining a first current of the latent image and a second current of a Paschen breakdown voltage, measured after manufacturing, between the developer roll and the drum.

2. The method of claim 1, wherein the sensing the current occurs in the power supply.

3. The method of claim 1, further including providing the current to the controller.

4. The method of claim 1, further including storing the first and second currents in a memory accessible by the controller.

5. The method of claim 1, further including, by the controller, subtracting from the current the first and second currents.

6. The method of claim 1, further including determining a charge of the toner.

7. The method of claim 1, further including determining a charge per mass of the toner.

8. The method of claim 1, further including determining a mass of the toner.

9. The method of claim 1, further including developing a toner patch on the intermediate transfer member.

10. The method of claim 9, further including projecting a light on the toner patch and collecting the light scattered from the toner patch.

11. The method of claim 10, further including determining a toner mass from the light scattered.

12. The method of claim 11, further including using the sensed current and the determined toner mass of the toner patch to determine an operating condition of the toner.

13. The method of claim 1, further including changing a third voltage on the developer roll or the drum based on the sensed current.

14. The method of claim 1, further including providing a toner cartridge having said toner.

15. In an imaging device having a photoconductive drum opposed by developer roll to provide toner to the drum to develop a latent image on the drum for transfer to media or an intermediate transfer member and later the media, further including a power supply in communication with a controller, a method comprising:

with the power supply, setting a first voltage on a charge roll that creates a second voltage on a surface of the drum;

based on the first and second voltages, transferring the toner from a developer roll to the drum;

sensing a current between the developer roll and the drum; and providing a resistor through which the current is sensed and the sensed current having a corresponding voltage being amplified and provided to the controller.

16. In an imaging device having a supply of toner in communication with a toner adder roll for providing the toner to a developer roll opposing a photoconductive drum to develop with the toner a latent image on the drum for first transfer to an intermediate transfer member and second transfer to media, further including a high voltage power supply in communication with a controller, a method comprising:

with the power supply, setting a first voltage on a charge roll that creates a second voltage on a surface of the drum;

based on the first and second voltages, transferring the toner from a developer roll to the drum;

sensing a current between the developer roll and the drum, including determining a first current of the latent image and a second current of a Paschen breakdown voltage, measured after manufacturing, between the developer roll and the drum, further storing the first and second currents in a memory accessible by the controller, the controller subtracting from the current the first and second currents; and providing the current or corresponding voltage to the controller for determining a mass of the toner for setting with the power supply an operating voltage on the drum or developer roll.

17. The method of claim 16, further including developing a toner patch on the intermediate transfer member and projecting a light on the toner patch, further collecting the light scattered from the toner patch and the controller determining a toner mass from the light scattered.

* * * * *